US011009256B2

(12) United States Patent
Mills et al.

(10) Patent No.: US 11,009,256 B2
(45) Date of Patent: May 18, 2021

(54) CRACK-RESISTANT POLYMER FOAM DUCTS AND METHOD OF INSTALLING SAME

(71) Applicant: The Boeing Company, Chicago, IL (US)

(72) Inventors: John Steve Mills, Decatur, AL (US); Orlando Torres, Titusville, FL (US); Creed Ernest Blevins, Aliso Viejo, CA (US); Luisa F. Gutierrez, Palm Springs, FL (US); Charles Douglas Hall, Madison, AL (US)

(73) Assignee: The Boeing Company, Chicago, IL (US)

( * ) Notice: Subject to any disclaimer, the term of this patent is extended or adjusted under 35 U.S.C. 154(b) by 120 days.

(21) Appl. No.: 16/228,073

(22) Filed: Dec. 20, 2018

(65) Prior Publication Data
US 2020/0200428 A1 Jun. 25, 2020

(51) Int. Cl.
*F24F 13/02* (2006.01)
*F16L 3/18* (2006.01)
(Continued)

(52) U.S. Cl.
CPC ............ *F24F 13/0254* (2013.01); *F16L 3/18* (2013.01); *F24F 13/0245* (2013.01);
(Continued)

(58) Field of Classification Search
CPC ........ B64G 2001/228; F16L 3/16; F16L 3/18; F16L 9/128; F16L 57/02; F24F 13/0254
(Continued)

(56) References Cited

U.S. PATENT DOCUMENTS 2,255,391 A * 9/1941 Mesnel .................... F16L 11/10
138/129
2,410,753 A * 11/1946 Shinomiya ................ E21B 7/06
175/82
(Continued)

FOREIGN PATENT DOCUMENTS

EP 213209 A1 3/1987
EP 2149761 A2 2/2010
(Continued)

OTHER PUBLICATIONS

Himelblau, H. et al., "Dynamic Environmental Criteria," NASA Technical Handbook, Mar. 13, 2001, retrieved from https://standards.nasa.gov/standard/nasainasa-hdbk-7005.

*Primary Examiner* — Kenneth Rinehart
*Assistant Examiner* — Richard K. Durden
(74) *Attorney, Agent, or Firm* — Armstrong Teasdale LLP (57) ABSTRACT

A low pressure duct configured to channel a gas within a structure includes a tubular body formed from a polymer foam material, and a first plurality of strands adhered to a surface of the tubular body along a plurality of paths. The plurality of paths includes a first set of paths oriented longitudinally along the tubular body. The first set of paths are spaced apart from each other around a circumference of the tubular body. The plurality of paths also includes a second set of paths oriented circumferentially around the tubular body. The second set of paths are spaced apart longitudinally along the tubular body.

20 Claims, 7 Drawing Sheets

(51) Int. Cl.
  *B64G 1/22* (2006.01)
  *B64D 13/00* (2006.01)
  *F16L 59/02* (2006.01)

(52) U.S. Cl.
  CPC ........ *B64D 13/00* (2013.01); *B64G 2001/228* (2013.01); *F16L 59/027* (2013.01); *F24F 13/0209* (2013.01); *F24F 13/0218* (2013.01); *F24F 13/0263* (2013.01)

(58) Field of Classification Search
  USPC .................................................. 220/648, 650
  See application file for complete search history.

(56) References Cited

U.S. PATENT DOCUMENTS

| | | | | |
|---|---|---|---|---|
| 2,613,042 A * | 10/1952 | Dice, Jr. | ............ | B65H 19/1873 242/554.2 |
| 2,680,272 A * | 6/1954 | Radtke | ................ | B29C 66/9161 24/16 PB |
| 3,002,534 A * | 10/1961 | Noland | ..................... | B04B 7/08 138/141 |
| 3,172,428 A * | 3/1965 | Tudge | ..................... | F16L 11/118 138/172 |
| 3,631,897 A * | 1/1972 | Fischer | ..................... | F16L 9/08 138/141 |
| 3,687,168 A | 8/1972 | Sherman et al. | | |
| 3,698,746 A * | 10/1972 | Loncaric | ................. | F16L 57/02 285/288.8 |
| 3,700,527 A * | 10/1972 | Grosh | ................... | B29C 41/085 156/426 |
| 3,860,043 A * | 1/1975 | Kutnyak | ................. | E03C 1/122 138/153 |
| 4,089,719 A * | 5/1978 | Sundell | ............... | B29C 53/8058 156/171 |
| 4,559,974 A * | 12/1985 | Fawley | ................... | B29C 53/66 138/172 |
| 5,692,699 A * | 12/1997 | Weirauch | ............. | B65H 19/102 242/556.1 |
| 5,947,158 A | 9/1999 | Gross et al. | | |
| 6,013,341 A * | 1/2000 | Medvedev | ................ | E04B 1/36 428/114 |
| 6,129,119 A * | 10/2000 | Schwert | ............... | C07D 217/14 138/98 |
| 6,736,168 B2 * | 5/2004 | Amano | ............... | B29C 53/8016 138/129 |
| 8,567,824 B2 | 10/2013 | Bourdariat et al. | | |
| 2003/0090104 A1* | 5/2003 | Woodward | .............. | F16L 33/08 285/23 |
| 2005/0046355 A1 | 3/2005 | Quanyi et al. | | |
| 2008/0308674 A1* | 12/2008 | Frantz | ................. | B29C 66/4322 244/118.5 |
| 2010/0059133 A1* | 3/2010 | Witz | ..................... | F16L 11/115 138/109 |
| 2014/0271531 A1 | 9/2014 | Freyman et al. | | |
| 2014/0272307 A1 | 9/2014 | Sas | | |
| 2015/0204476 A1* | 7/2015 | Lazzara | .................. | F16L 9/042 138/99 |
| 2015/0285423 A1* | 10/2015 | Bureau | ................... | D03D 3/02 138/97 |
| 2015/0321772 A1 | 11/2015 | Taylor | | |
| 2017/0219136 A1* | 8/2017 | Merheb | .................. | F16L 51/025 |
| 2017/0328497 A1* | 11/2017 | Dantin | .................... | B64D 13/00 |

FOREIGN PATENT DOCUMENTS

| | | |
|---|---|---|
| WO | 2000028247 A1 | 5/2000 |
| WO | 2008043898 A1 | 4/2008 |

\* cited by examiner

CRACK-RESISTANT POLYMER FOAM DUCTS AND METHOD OF INSTALLING SAME

STATEMENT REGARDING FEDERALLY SPONSORED RESEARCH & DEVELOPMENT

This disclosure was made with Government support under contract NNM07AB03C awarded by the National Aeronautics and Space Administration. The government has certain rights in this invention.

FIELD

The field of the disclosure relates generally to ducts formed from a polymer foam material and configured to convey low pressure gases and, more specifically, to a system and method for reducing cracks in such polymer foam ducts.

BACKGROUND

In some known structures, polymer foam ducts are used to convey low pressure gases for various purposes. For example, but not by way of limitation, in some known aircraft and spacecraft, polymer foam ducts are used to convey low pressure purge gases and/or ventilation gases to desired locations within the structure. Moreover, at least some known polymer foam ducts are supported within the structure by rings formed from a thermoplastic material and spaced apart along the duct.

Known methods of reinforcing ducts against cracking are limited in that the reinforcement means typically reduces the benefits sought from the use of the ducts, such as low weight and low cost. In many applications, some amount of cracking can be accommodated.

BRIEF DESCRIPTION

One aspect of the present disclosure includes a duct configured to channel a low pressure gas within a structure. The duct includes a tubular body formed from a polymer foam material, and a first plurality of strands adhered to a surface of the tubular body along a plurality of paths. The plurality of paths includes a first set of paths oriented longitudinally along the tubular body. The first set of paths are spaced apart from each other around a circumference of the tubular body. The plurality of paths also includes a second set of paths oriented circumferentially around the tubular body. The second set of paths are spaced apart longitudinally along the tubular body.

Another aspect of the present disclosure includes a duct configured to channel a low pressure gas within a vehicle. The duct includes a tubular body formed from a polymer foam material, and a fixed ring mounted to the vehicle and extending circumferentially around the tubular body. The fixed ring is affixed to the tubular body. The duct also includes a free ring mounted to the vehicle and extending circumferentially around the tubular body. The tubular body is longitudinally slidable with respect to the free ring. The duct further includes a first plurality of strands adhered to a surface of the tubular body along a plurality of paths. The plurality of paths includes a first set of paths oriented longitudinally along the tubular body. The first set of paths are spaced apart from each other around a circumference of the tubular body. The plurality of paths also includes a second set of paths oriented circumferentially around the tubular body. The second set of paths are spaced apart longitudinally along the tubular body.

Yet another aspect of the present disclosure includes a method of installing duct on a vehicle, the duct configured to channel a low pressure gas. The method includes affixing a fixed ring to a tubular body. The fixed ring extends circumferentially around the tubular body. The method also includes positioning a free ring circumferentially around the tubular body, wherein the tubular body is longitudinally slidable with respect to the free ring. The method further includes adhering a first plurality of strands to a surface of the tubular body along a plurality of paths. The plurality of paths includes a first set of paths oriented longitudinally along the tubular body. The first set of paths are spaced apart from each other around a circumference of the tubular body. The plurality of paths also includes a second set of paths oriented circumferentially around the tubular body. The second set of paths are spaced apart longitudinally along the tubular body. Additionally, the method includes mounting the fixed ring and the free ring to the vehicle.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

Although specific features of various examples may be shown in some drawings and not in others, this is for convenience only. Any feature of any drawing may be referenced and/or claimed in combination with any feature of any other drawing.

Unless otherwise indicated, the drawings provided herein are meant to illustrate features of examples of the disclosure. These features are believed to be applicable in a wide variety of systems comprising one or more examples of the disclosure. As such, the drawings are not meant to include all conventional features known by those of ordinary skill in the art to be required for the practice of the examples disclosed herein.

DETAILED DESCRIPTION

Examples of the ducts for conveying low pressure gases described herein include a tubular body formed from a polymer foam material. A first plurality of strands is adhered to a surface of the tubular body along a plurality of paths. The strands arranged on specific paths on the surface, as described herein, provide an unexpected structural enhancement that reduces or eliminates cracking of the polymer foam duct not only in the region of the paths, but in some examples, over substantially the entire body of the duct. In particular, a first set of paths extends longitudinally along the tubular body and the paths are spaced apart from each other around a circumference of the tubular body. A second set of paths extends circumferentially around the tubular body and the paths are spaced apart longitudinally. In some examples, the strands are formed from pieces of adhesive tape. In certain examples, the duct is supported by rings, and a second plurality of strands is applied to a surface of the rings, reducing or eliminating cracking in the rings. For example, in comparison to known methods of reinforcing a polymer foam duct or to replacing the polymer foam with a more crack-resistant material, the use of the strands preserves a low weight and low cost of manufacture of the duct, while unexpectedly reducing or eliminating an occurrence of cracking of the tubular body and/or the rings in response to operational vibration loads, thereby increasing an operational lifetime of the duct.

Unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

For purposes of this disclosure, a duct configured to convey a "low pressure" gas is a duct intended to convey gas at a gauge pressure, during normal operation, in a range of about −2.0 pounds per square inch (gauge) (psig) to about +2.0 psig. Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. For example, the approximating language may correspond to the precision of an instrument for measuring the value.

Figure 1:
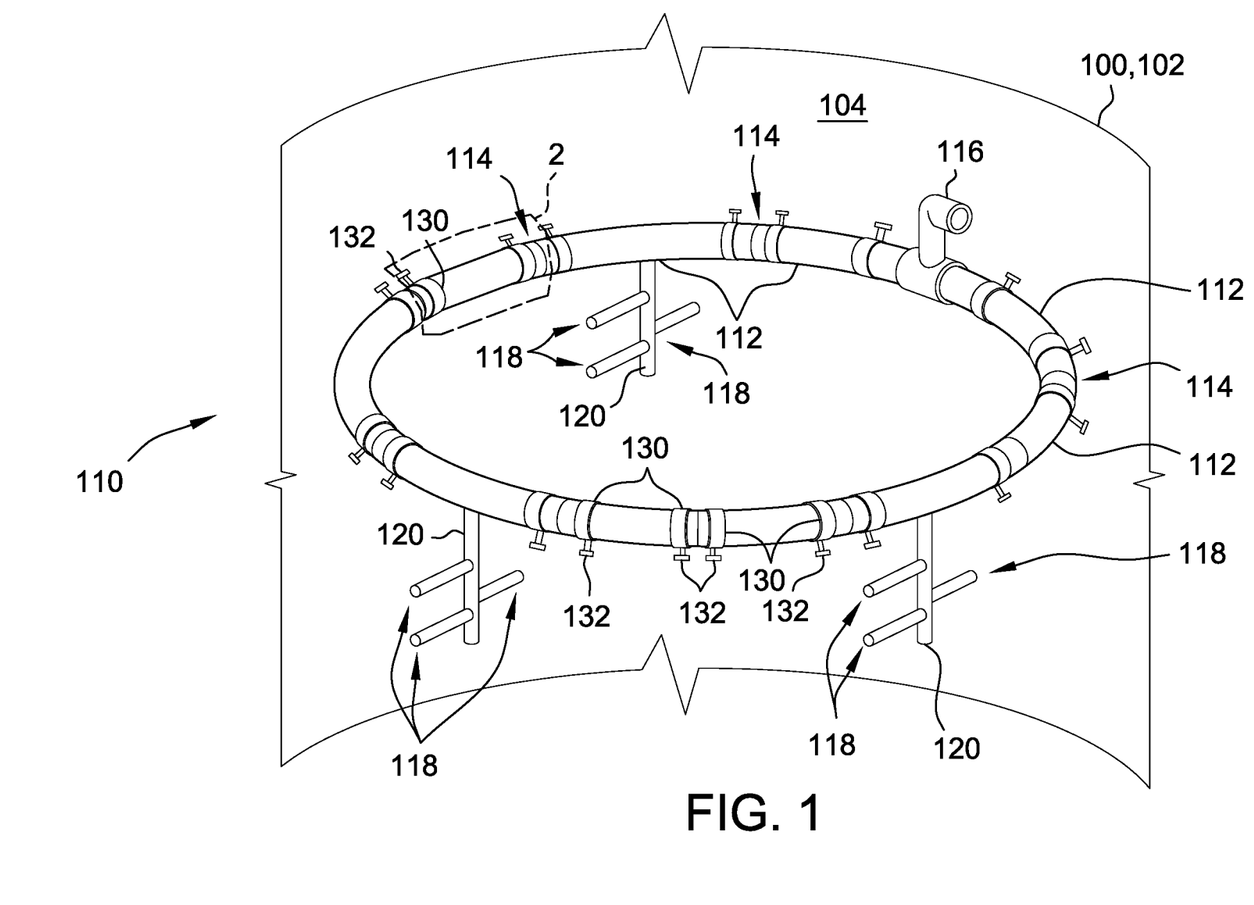
FIG. 1 is a schematic perspective view of an example of a duct mounted in a structure.

FIG. 1 is a schematic perspective view of an example of a duct 110 mounted in a structure 100, and more specifically in a flight vehicle 102. For example, flight vehicle 102 is an aircraft or a spacecraft. Structure 100 is illustrated in cutaway fashion to facilitate a clearer view of duct 110. Although duct 110 is illustrated as being mounted in flight vehicle 102, in alternative examples duct 110 is mounted in any suitable structure 100, including, but not limited to, seacraft, land vehicles, and stationary structures. Duct 110 is configured to channel a low pressure gas within structure 100.

The example duct 110 includes a plurality of generally tubular duct portions 112. Each of duct portions 112 is coupled end-to-end to an adjacent one of duct portions 112 at a respective joint 114, such that duct portions 112 are in flow communication with each other. In the example, duct portions 112 are arranged to form a generally toroidal configuration. In alternative examples, duct portions 112 are arranged in any suitable fashion that enables duct 110 to function as described herein.

In the example, duct 110 also includes at least one inlet 116 coupled in flow communication with duct portions 112. The at least one inlet 116 is configured to supply a low pressure flow of gas into duct portions 112, such as a purge gas. For example, the at least one inlet 116 is also coupled in flow communication with a source (not shown) of the low pressure flow of gas. In alternative examples, duct portions 112 are supplied with a low pressure flow of the gas in any suitable fashion that enables duct 110 to function as described herein.

In the example, duct 110 further includes at least one outlet 118 coupled in flow communication with duct portions 112. The at least one outlet 118 is configured to emit the gas from duct portions 112. In the illustrated example, the at least one outlet 118 includes a plurality of outlets 118 coupled in flow communication to duct portions 112 via a plurality of branch lines 120. In alternative examples, the at least one outlet 118 includes any suitable number of outlets 118 coupled in flow communication with duct portions 112 in any suitable fashion that enables duct 110 to function as described herein. In the example, the at least one outlet 118 is positioned to supply the low pressure flow of gas from duct portions 112 into a corresponding compartment (not shown) of flight vehicle 102, for example to ventilate the compartment and/or to facilitate purging other (e.g., potentially flammable or noxious gases) from the compartment. In alternative examples, each outlet 118 is positioned in any suitable fashion that enables duct 110 to function as described herein.

In the example, duct 110 further includes a plurality of support rings 130 configured to position duct portions 112 with respect to structure 100. Each support ring 130 extends circumferentially around one of duct portions 112. Moreover, in the example, each support ring 130 is mounted to a skin 104 of flight vehicle 102 via a mounting fixture 132. In alternative examples, each mounting fixture 132 mounts the corresponding support ring 130 to any suitable portion of flight vehicle 102. In alternative examples, duct portions 112 are positioned with respect to structure 100 in any suitable fashion that enables duct 110 to function as described herein.

Figure 2A:
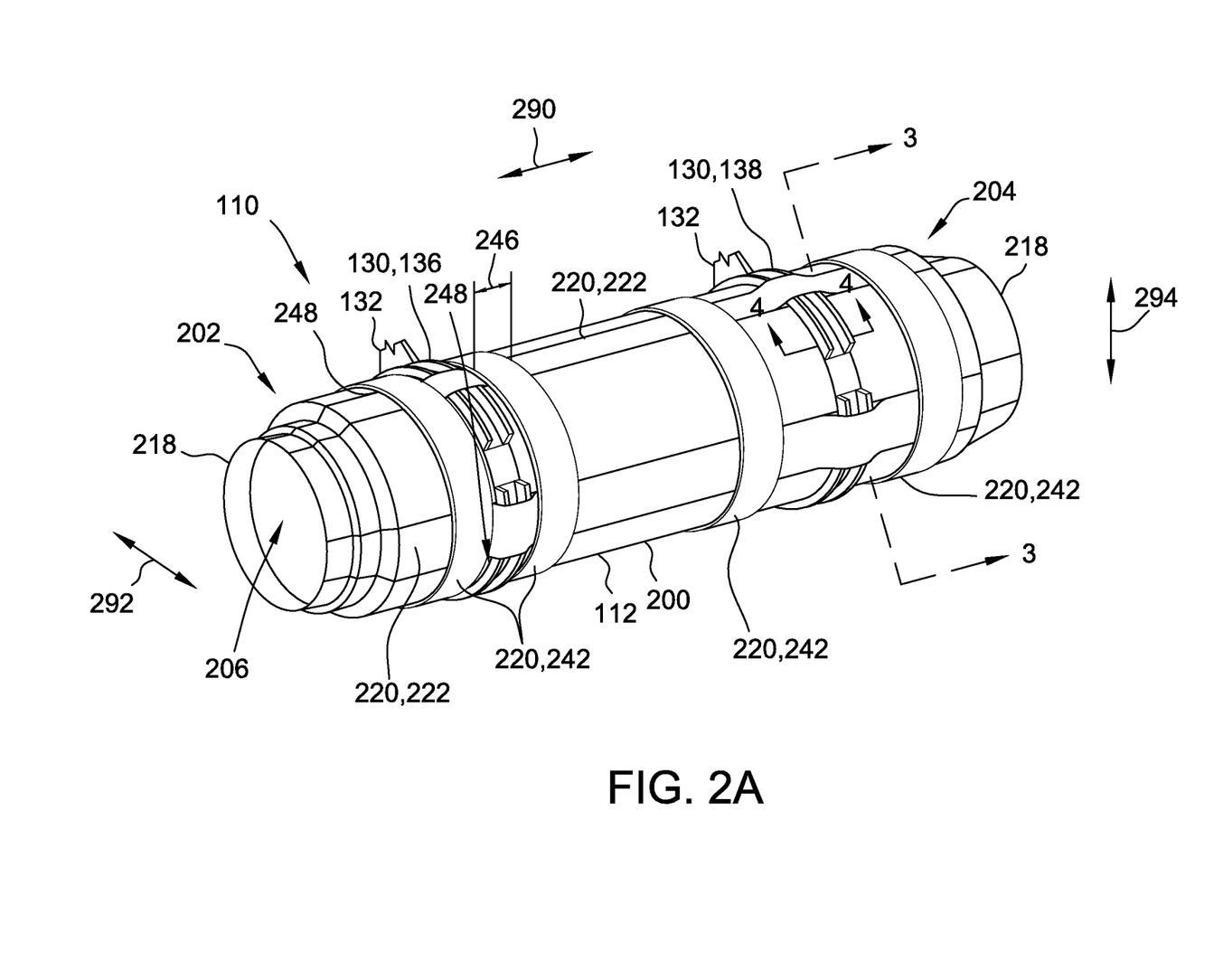
FIG. 2A is a schematic perspective view of an example of a portion of the duct shown in FIG. 1, including a first plurality of strands adhered to a surface of a tubular body of the duct.
Figures 2B, 2C:
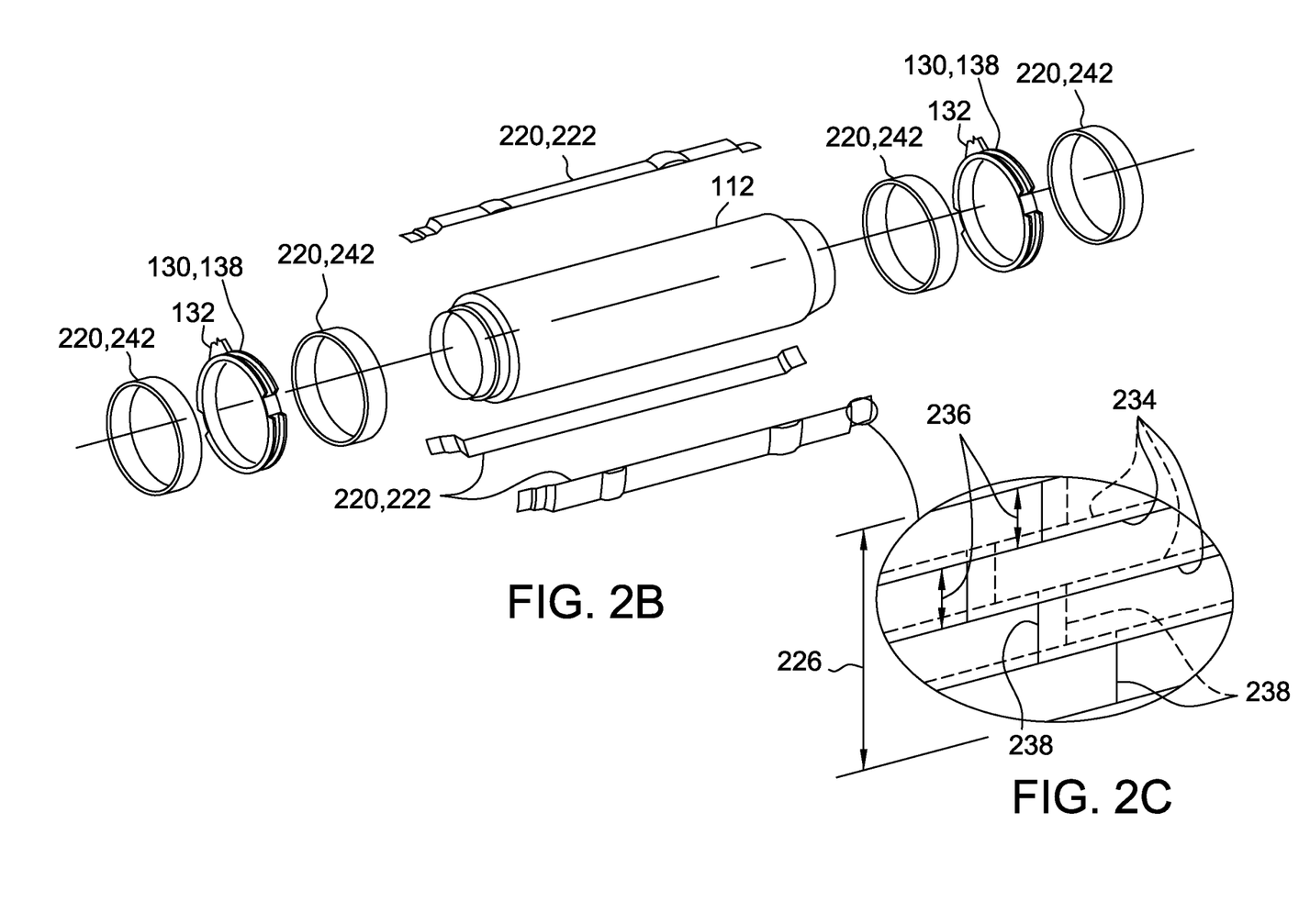
FIG. 2B is an exploded view of FIG. 2A.
FIG. 2C is a detail view of FIG. 2B.
Figure 3:
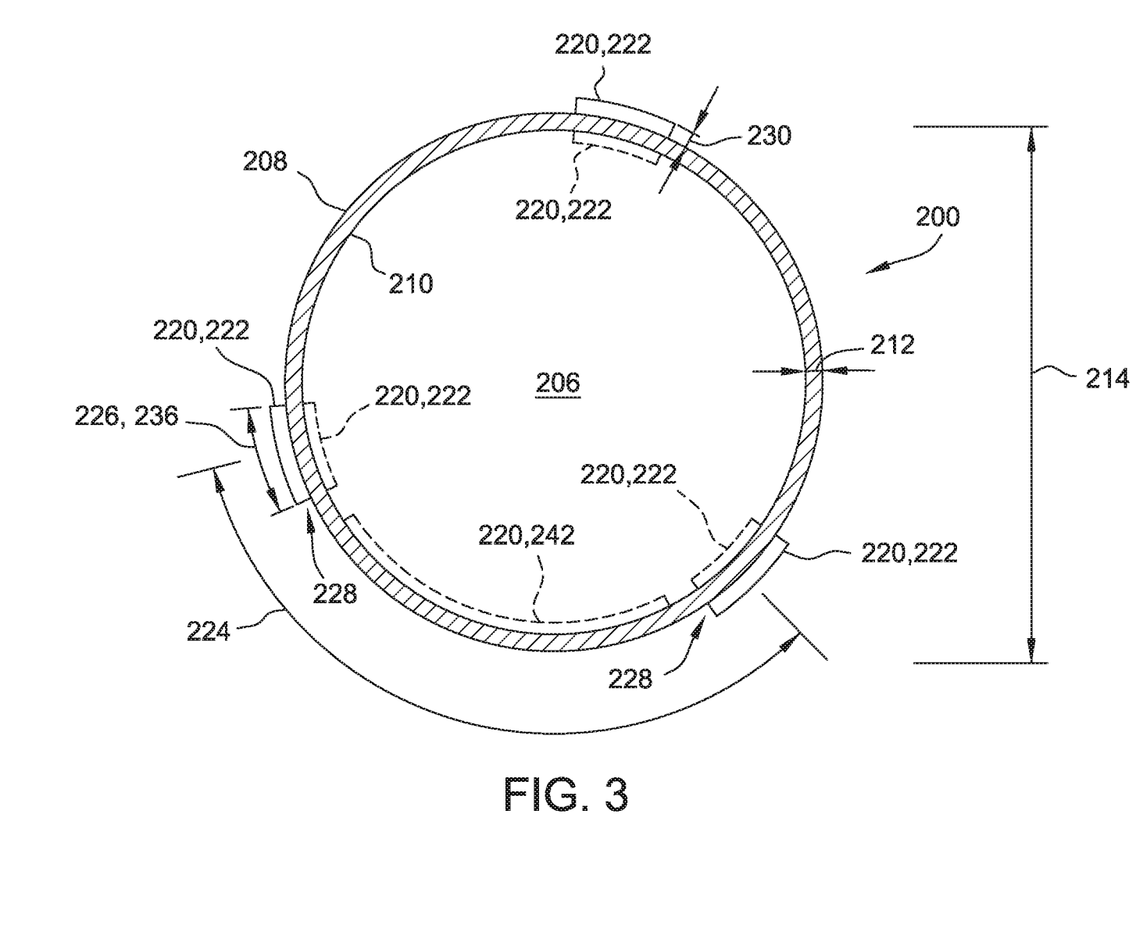
FIG. 3 is a schematic sectional view of the portion of the duct shown in FIG. 2A, illustrating an example of a spacing of a first set of paths of the first plurality of strands.

FIG. 2A is a schematic perspective view of an example of a portion of duct 110 identified at 2 in FIG. 1, including a first plurality of strands 220 adhered to a surface of a tubular body 200 of the duct. More specifically, the portion of duct 110 shown in FIG. 2A includes one of duct portions 112 circumscribed by two support rings 130 each coupled to a corresponding mounting fixture 132. FIG. 2B is an exploded view of FIG. 2A, and FIG. 2C is a detail view of FIG. 2B illustrating an example arrangement of strands 220 in a path. FIG. 3 is a schematic sectional view of the portion of duct 110 taken along lines 3-3 in FIG. 2A, illustrating an example of a spacing of a first set of paths 222 of the first plurality of strands 220. The term "adhered" in this context indicates that strands 220 are attached to the surface such that a separation force is required to separate strands 220 from the surface. In some examples, at least some of the advantages described herein are obtained by strands 220 adhered such that a separation force of at least 10 ounces per inch length of strand 220 is required to separate strands 220 from the surface of tubular body 200. Moreover, in some examples, the advantages described herein are obtained by strands 220 adhered such that a separation force of at least 25 ounces per inch length of strand 220 is required to separate strands 220 from the surface of tubular body 200.

With reference to FIGS. 2 and 3, in the example, duct portion 112 includes tubular body 200 formed from a polymer foam material. In some examples, tubular body 200 being formed from polymer foam material provides relatively good thermal insulation for the low pressure flow of gas in duct 110, and/or provides a relatively low weight, as compared to ducts formed from metallic or other more crack-resistant materials, to reduce an overall flight weight of flight vehicle 102. For example, but not by way of limitation tubular body 200 is formed from a fluoropolymer, such as polyvinylidene difluoride (PVDF), that has a much lower density than typical metallic materials. In alternative examples, tubular body 200 is formed from any suitable material that enables duct 110 to function as described herein.

For purposes of description, a longitudinal direction 290 is defined parallel to a direction of the flow of gas through duct portion 112, and a first lateral direction 292 and a second lateral direction 294 are defined, perpendicular to each other, in a plane orthogonal to longitudinal direction 290. Second lateral direction 294 also is parallel to a diameter of tubular body 200 drawn through mounting fixture 132. In some examples, longitudinal direction 290 varies locally along duct 110. For example, with reference to FIG. 1, longitudinal direction 290 is generally tangent to a curvature of duct 110 at each point along duct 110. In such examples, first lateral direction 292 and second lateral direction 294 defined orthogonal to longitudinal direction 290 also vary locally along duct 110. In alternative examples, longitudinal direction 290 does not vary locally along duct 110, e.g., duct 110 is substantially straight.

Returning to FIGS. 2 and 3, tubular body 200 extends longitudinally from a first end 202 to a second end 204 and defines a channel 206 therebetween. Although tubular body 200 is illustrated in FIG. 2 as generally linear from first end 202 to second end 204, in alternative examples, tubular body 200 is at least partially arced or curved along the longitudinal path from first end 202 to second end 204. Tubular body 200 also includes an interior surface 210 facing channel 206, and an exterior surface 208 opposite interior surface 210.

In certain examples, tubular body 200 has a wall thickness 212 and an outer diameter 214 selected to accommodate a desired low pressure flow of gas through duct 110. For example, tubular body 200 has outer diameter 214 in a range from about 2.0 inches to about 20.0 inches. In alternative examples, tubular body 200 has any suitable outer diameter 214 that enables duct 110 to function as described herein.

In certain examples, tubular body 200 has wall thickness 212 in a range from about 0.150 inches to about 0.500 inches. Moreover, in some examples, tubular body 200 has wall thickness 212 in a range from about 0.250 inches to about 0.300 inches. In alternative examples, tubular body 200 has any suitable wall thickness 212 that enables duct 110 to function as described herein.

In the example, duct portion 112 also includes a respective interface ring 218 mounted at each of first end 202 and second end 204 of tubular body 200. Each interface ring 218 is configured to couple to interface ring 218 of an adjacent duct portion 112 (not shown). In the example, outer diameter 214 of tubular body 200 tapers inward at each of first end 202 and second end 204 towards interface ring 218. In alternative examples, tubular body 200 has any suitable shape at first end 202 and second end 204. In other alternative examples, duct portion 112 does not include interface rings 218.

In the example, support rings 130 include a fixed ring 136 that is affixed to tubular body 200, such that tubular body 200 and fixed ring 136 are constrained to move together in longitudinal direction 290. For example, fixed ring 136 is adhesively bonded to tubular body 200 or permanently mounted on tubular body 200 in another suitable fashion. In the example, support rings 130 also include a free ring 138 that is longitudinally slidable with respect to tubular body 200. In some examples, tubular body 200 being fixed longitudinally by a single fixed ring 136, and longitudinally slidable with respect to free ring 138, enables tubular body 200 to longitudinally expand and contract in response to thermal changes, and/or accommodate other longitudinal displacement, without free ring 138 inducing compression and tension forces in tubular body 200. In alternative examples, duct 110 includes any suitable number of free and/or fixed support rings 130 circumscribing each duct portion 112. In other alternative examples, duct 110 includes no support rings 130 and is positioned with respect to structure 100 (shown in FIG. 1) in any suitable fashion that enables duct 110 to function as described herein.

In the example, support rings 130 are formed from a thermoplastic material. In some examples, support rings 130 being formed from thermoplastic material provides sufficient structural strength to retain duct 110 in position relative to structure 100 (shown in FIG. 1) while having a relatively low weight to reduce an overall flight weight of flight vehicle 102. In alternative examples, support rings 130 are formed from any suitable material that enables duct 110 to function as described herein.

Duct 110 also includes a first plurality of strands 220 adhered to a surface of tubular body 200 (i.e., at least one of exterior surface 208 and interior surface 210 of tubular body 200) along a plurality of paths. Strands 220 are flat, elongated portions of material having a strand thickness 230 that is no more than ten percent of a strand width 236. Each path is formed along the surface of tubular body 200 by one or more strands 220. Strands 220 arranged on specific paths on the surface, as described herein, provide an unexpected structural enhancement that, in some examples, reduces or eliminates cracking of duct 110 not only in the region of the paths, but over substantially the entirety of tubular body 200.

The plurality of paths includes a first set of paths 222 oriented longitudinally along tubular body 200. In the example, the first set of paths 222 is adhered to exterior surface 208 of tubular body 200, as illustrated in FIG. 2 and as represented by solid lines in FIG. 3. In alternative examples, first set of paths 222 is adhered to interior surface 210 of tubular body 200, as represented by dashed lines in FIG. 3. In other alternative examples, at least one path 222 of the first set of paths 222 is adhered to exterior surface 208, and at least another path 222 of first set of paths 222 is adhered to interior surface 210.

In the example, each path 222 of the first set of paths 222 extends from first end 202 to second end 204 of tubular body 200. In alternative examples, at least one path 222 of the first set of paths 222 extends over less of a longitudinal extent of tubular body 200 than from first end 202 to second end 204.

In the example shown in FIG. 2C, at least one path 222 of the first set of paths 222 includes a corresponding portion of the first plurality of strands 220 arranged in an end-to-end overlapping relationship. In other words, each strand extends longitudinally between opposing strand ends 238, and path 222 is formed from multiple strands 220 arranged end-to-end, such that one end 238 of each strand 220 overlaps end 238 of a longitudinally adjacent strand 220. In some such examples, the use of overlapping multiple strands reduces an amount of local wrinkling of, and/or improves an adherence of, strands 220 along path 222. Additionally or alternatively, at least one path 222 of the first set of paths 222 is formed from a single, monolithic strand 220.

Returning to FIGS. 2 and 3, in the example, each path 222 of the first set of paths 222 overlays fixed ring 136 where fixed ring 136 and paths 222 intersect. In other words, strands 220 are applied to exterior surface 208 to form paths 222 after fixed ring 136 is affixed to tubular body 200, such that where fixed ring 136 and paths 222 intersect, fixed ring 136 is positioned between paths 222 and exterior surface 208. In alternative examples, strands 220 of paths 222 are positioned between fixed ring 136 and exterior surface 208. In other alternative examples, first set of paths 222 is adhered to interior surface 210, such that paths 222 do not intersect fixed ring 136.

In the example, strands 220 in first set of paths 222 are adhered to fixed ring 136 where support rings 130 and paths 222 intersect. For example, adhering strands 220 in first set of paths 222 to fixed ring 136 improves an overall retention of strands 220 on duct portion 112. In alternative examples, strands 220 in first set of paths 222 are not adhered to fixed ring 136 where fixed ring 136 and paths 222 intersect.

In the example, each path 222 of the first set of paths 222 includes at least one strand 220 that overlays free ring 138 where free ring 138 and paths 222 intersect, and at least one strand that runs beneath free ring 138 where free ring 138 and paths 222 intersect. In alternative examples, all strands 220 in each path 222 of the first set of paths 222 overlay free ring 138 where free ring 138 and paths 222 intersect. In other alternative examples, all strands 220 in each path 222 of the first set of paths 222 run beneath free ring 138 where free ring 138 and paths 222 intersect. Moreover, in the example, strands 220 in first set of paths 222 are not adhered to free ring 138 where free ring 138 and paths 222 intersect. In some examples, not adhering strands 220 in first set of paths 222 to free ring 138 facilitates preserving tubular body 200 being longitudinally slidable with respect to free ring 138. For example, strands 220 in first set of paths 222 are modified to be double-backed (i.e., present no adhesive surface) where strands 220 intersect free ring 138. In alternative examples, strands 220 in first set of paths 222 are adhered to free ring 138 where support rings 130 and paths 222 intersect. For example, a slack area is provided in paths 222 adjacent to free ring 138.

The first set of paths 222 do not touch or overlap each other, but rather are spaced apart from each other around a circumference of tubular body 200. In other words, a spacing 224 between a centerline of each path 222 is greater than a circumferential width 226 of paths 222, such that respective circumferential edges 228 of adjacent paths 222 do not touch or overlap.

In certain examples, the arrangement of first set of paths 222 spaced apart from each other around the circumference of tubular body 200, i.e., leaving a substantial portion of the surface of tubular body 200 uncovered by strands 220, reduces or eliminates cracking of duct 110 not only in the region of paths 222, but also in other regions of tubular body 200, and in some examples over an entirety of tubular body 200. More specifically, in some examples, at least some of the advantages described herein are obtained by circumferential width 226 of each path 222 being in a range from about 4 percent to about 20 percent of a circumference of tubular body 200, and a cumulative circumferential width 226 of all paths 222 on tubular body 200 being in a range from about 15 percent to about 50 percent of a circumference of tubular body 200. For example, tubular body 200 has outer diameter 214 of about 8 inches, circumferential width 226 of each path 222 is about 2 inches, and there are three paths 222 spaced apart from each other around the circumference of tubular body 200. For another example, tubular body 200 has outer diameter 214 of about 6 inches, circumferential width 226 of each path 222 is 1 inch, and there are three paths 222 spaced apart from each other around the circumference of tubular body 200. For another example, tubular body 200 has outer diameter 214 of about 12 inches, circumferential width 226 of each path 222 is 2 inches, and there are three paths 222 spaced apart from each other around the circumference of tubular body 200. For another example, tubular body 200 has outer diameter 214 of about 20 inches, circumferential width 226 of each path 222 is 3 inches, and there are five paths 222 spaced apart from each other around the circumference of tubular body 200. In alternative examples, circumferential width 226 of each path 222 is any suitable percentage of the circumference of tubular body 200, and/or the cumulative circumferential width 226 of all paths 222 on tubular body 200 is any suitable percentage of the circumference of tubular body 200, and/or there is any suitable number of paths 222, that enables duct 110 to function as described herein.

In the example, each path 222 has a substantially identical circumferential width 226. In alternative examples, at least one path 222 has a circumferential width 226 that differs from another of paths 222. In the example, first set of paths 222 is spaced apart equidistantly around the circumference of tubular body 200. For example, in the illustrated example, the three paths 222 are spaced apart from each other by 120 degrees. In alternative examples, first set of paths 222 is spaced apart in any suitable fashion that enables duct 110 to function as described herein.

In certain examples, strands 220 have a strand thickness 230 in a range from about 0.004 inches to about 0.010 inches. Moreover, in some examples, strands 220 have strand thickness 230 in a range from about 0.005 inches to about 0.007 inches. In alternative examples, strands 220 have thickness 230 in any suitable range that enables duct 110 to function as described herein. In particular, in some examples, strands 220 are formed from a commercial off-the-shelf fiberglass adhesive tape. In alternative examples, strands 220 are formed from a commercial off-the-shelf fiberglass cloth cut to a selected width and adhered to tubular body 200 using a suitable commercial off-the-shelf adhesive. In certain examples, the use of fiberglass-based strands 220 meets requirements associated with operation of duct 110, such as flexibility over an operating temperature range of structure 100. For example, in some examples, flight vehicle 102 operates at temperatures of about −20 degrees Fahrenheit. In other alternative examples, strands 220 are formed from any suitable material and adhered to tubular body 200 in any suitable fashion that enables duct 110 to function as described herein.

In the example, at least one of strands 220 has a strand width 236 equal to circumferential width 226 of the corresponding path 222, as illustrated in the cross-section shown in FIG. 3. For example, strands 220 are formed from commercial off-the-shelf adhesive tape having strand width 236 equal to circumferential width 226, or from commercial off-the-shelf fiberglass cloth cut to circumferential width 226, such that strand width 236 of a single strand 220 defines circumferential width 226. Moreover, as illustrated in FIG. 2C, at least some other strands 220 have strand width 236 less than circumferential width 226 and are adhered to tubular body 200 side-by-side, or with longitudinal edges 234 overlapping, to establish circumferential width 226. For example, in some examples, circumferential width 226 is 2 inches, strands 220 having strand width 236 of 0.75 inches placed side-by-side in overlapping relationship are used to define portions of path 222 adjacent interface rings 218, and strands 220 having strand width 236 of two inches are used to define path 222 along the remaining central portion of tubular body 200. Such a use of side-by-side strands 220 along the tapered portions of tubular body 200 adjacent interface rings 218 reduces a wrinkling of strands 220 in some examples. In alternative examples, strands 220 having any suitable strand width 236 are used at any suitable location along each path 220 that enables duct 110 to function as described herein.

In some examples, duct portion 112 is subjected to vibrational forces during operation, such as during launch and/or flight of flight vehicle 102. In some such examples, absent first plurality of strands 220 adhered to a surface of tubular body 200, tubular body 200 is at risk of cracking in response to the operational vibrational loads, particularly vibrational loads in the plane defined by first lateral direction 292 and second lateral direction 294. However, as described above, first plurality of strands 220 oriented longitudinally along first set of paths 222, and spaced apart from each other circumferentially, unexpectedly inhibits or prevents such cracking of tubular body 200 under identical vibrational loads. A first test duct portion, lacking strands 220 but otherwise in accordance with duct portion 112 as described above, failed a test for crack damage under predicted dynamic loads and environments as outlined in NASA-HDBK-7005, "Dynamic Environmental Criteria" (National Aeronautics and Space Administration, Mar. 13, 2001). A second test duct portion, otherwise identical to the first test duct portion but including strands 220 along first set of paths 222 in accordance with duct portion 112 as described above, was undamaged in an identical test. Moreover, such a result is unexpected and not predictable based on known structural properties of strands 220 having the dimensions and physical properties described herein. Such strands are typically not considered to have any structural strength or stiffness.

In the example, the plurality of paths of the first plurality of strands 220 also includes a second set of paths 242 oriented circumferentially around tubular body 200. In the example, the second set of paths 242 is adhered to exterior surface 208 of tubular body 200, as illustrated in FIG. 2. In alternative examples, second set of paths 242 is adhered to interior surface 210 of tubular body 200. In other alternative examples, at least one path 242 of the second set of paths 242 is adhered to exterior surface 208, and at least another path 242 of second set of paths 242 is adhered to interior surface 210.

In the example, each path 242 of the second set of paths 242 extends around an entire circumference of tubular body 200. In alternative examples, at least one path 242 of the second set of paths 242 extends over less than the entire circumference of tubular body 200.

In the example, each path 242 of the second set of paths 242 includes a corresponding portion of the first plurality of strands 220 arranged in an end-to-end overlapping relationship. In other words, each path 242 is formed from multiple strands 220 arranged end-to-end, such that the end of each strand 220 overlaps the end of a circumferentially adjacent strand 220. In some such examples, the use of overlapping multiple strands reduces an amount of local wrinkling of, and/or improves an adherence of, strands 220 along path 242. In alternative examples, at least one path 242 of the second set of paths 242 is formed from a single, monolithic strand 220. Moreover, in some examples, each path 242 is formed from at least a double-wrap (i.e., at least two complete wrappings of the circumference of tubular body 200) of strands 220. In some such examples, a double-wrap of strands 220 in paths 242 further improves an adherence of strands 220 along path 242 and also improves a retention of strands 220 in first set of paths 222, as discussed further below.

The second set of paths 242 do not touch or overlap each other, but rather are spaced apart from each other longitudinally along tubular body 200. For example, second set of paths 242 are arranged in pairs of paths 242, and respective paths 242 of the pair are positioned on opposite longitudinal sides of a corresponding support ring 130, such that respective longitudinal edges 248 of adjacent paths 242 do not touch or overlap. In alternative examples, second set of paths 242 are spaced apart from each other longitudinally along tubular body 200 in any suitable fashion that enables duct 110 to function as described herein.

In some examples, a longitudinal width 246 of each path 242 is in a range from about 4 percent to about 20 percent of the circumference of tubular body 200. For example, tubular body 200 has outer diameter 214 of about 8 inches, and longitudinal width 246 of each path 242 is about 2 inches. For another example, tubular body 200 has outer diameter 214 of about 6 inches, and longitudinal width 246 of each path 242 is 1 inch. For another example, tubular body 200 has outer diameter 214 of about 12 inches, and longitudinal width 246 of each path 242 is 2 inches. For another example, tubular body 200 has outer diameter 214 of about 20 inches, and longitudinal width 246 of each path 242 is 3 inches. In alternative examples, longitudinal width 246 of each path 242 is any suitable percentage of the circumference of tubular body 200 that enables duct 110 to function as described herein.

In the example, each path 242 has a substantially identical longitudinal width 246. In alternative examples, at least one path 242 has a longitudinal width 246 that differs from another of paths 242.

In certain examples, strands 220 in paths 242 are formed from materials, and have thickness 230, as described above with respect to first set of paths 222 of strands 220. In alternative examples, strands 220 in second paths 242 are formed from any suitable material and adhered to tubular body 200 in any suitable fashion that enables duct 110 to function as described herein.

In the example, strands 220 have a width equal to longitudinal width 246 of the corresponding path 242. For example, strands 220 are formed from commercial off-the-shelf adhesive tape having a width equal to longitudinal width 246, or from commercial off-the-shelf fiberglass cloth cut to longitudinal width 246, such that a single strand 220 defines longitudinal width 246. In alternative examples, at least some strands 220 have a width less than longitudinal width 246 and are adhered to tubular body 200 side-by-side, or with circumferential edges overlapping, to establish longitudinal width 246. For example, in some examples, longitudinal width 246 is 2 inches, and 1-inch-wide strands 220 placed side-by-side are used to define path 242. Such a use of side-by-side 1-inch-wide strands 220 reduces a wrinkling of strands 220 in some examples.

In some examples, as described above, duct portion 112 is subjected to operational vibrational forces. In some such examples, second set of paths 242 of first plurality of strands 220 oriented circumferentially along tubular body 200, and spaced apart from each other longitudinally, unexpectedly further inhibits or prevents cracking of tubular body 200. For example, in the example, one pair of paths 242 is arranged on opposite sides of, and adjacent to, fixed ring 136. In this context, "adjacent to" fixed ring 136 indicates that a longitudinal edge of each path 242 of the pair is spaced apart from fixed ring 136 by less than 1 inch. For example, the longitudinal edge of each path 242 in the pair is spaced within about 0.2 inches of the corresponding longitudinal edge of fixed ring 136. In some examples, strands 220 in second set of paths 242 positioned adjacent to, and on opposite sides of, fixed ring 136 unexpectedly inhibits or prevents cracking of tubular body 200 adjacent to fixed ring 136 under operational vibrational loads. A third test duct portion, including strands 220 along first set of paths 222 and second set of paths 242 in accordance with duct portion 112 as described above, was altered to include a razor cut in tubular body 200 along an edge of fixed ring 136, simulating an initial crack at that location. The altered third test duct was then subjected to a test under predicted dynamic loads and environments as outlined in NASA-HDBK-7005. Growth of the simulated crack was prevented by strands 220 in the path 242 adjacent to fixed ring 136.

Additionally or alternatively, in certain examples, strands 220 in second set of paths 242 improve a retention of strands 220 in first set of paths 222. More specifically, first set of paths 222 includes a first portion of the first plurality of strands 220 and second set of paths 242 includes a second portion of the first plurality of strands 220, and the second portion of strands 220 overlays the first portion of strands 220 (i.e., strands 220 in first set of paths 222 pass between strands 220 in second set of paths 242 and the surface of tubular body 200), inhibiting separation of strands 220 in first paths 222 from tubular body 200.

In the example, second set of paths 242 also includes a pair of paths 242 positioned on opposite longitudinal sides of free ring 138. Moreover, in the example, a longitudinal edge of each path 242 of the pair is spaced apart from free ring 138. In this context, "spaced apart from" free ring 138 indicates that the longitudinal edge of each path 242 of the pair is spaced apart from free ring 138 by at least 1 inch. For example, the longitudinal edge of each path 242 in the pair is spaced from about 2 inches to about 3 inches away from the corresponding longitudinal edge of free ring 138.

In some examples, spacing apart each path 242 of the pair from free ring 138 facilitates preserving tubular body 200 being longitudinally slidable with respect to free ring 138. (In other words, to position the pair of paths 242 too close to free ring 138 potentially would increase a frictional force of strands 220 in first paths 222 sliding against free ring 138, inhibiting the ability of tubular body 200 and free ring 138 to slide with respect to each other.) In alternative examples, the pair of paths 242 positioned on opposite longitudinal sides of free ring 138 has any suitable spacing with respect to free ring 138 that enables duct 110 to function as described herein. In other alternative examples, support rings 130 do not include free ring 138 and/or second set of paths 242 does not include the pair of paths 242 positioned on opposite longitudinal sides of free ring 138.

Figure 4:
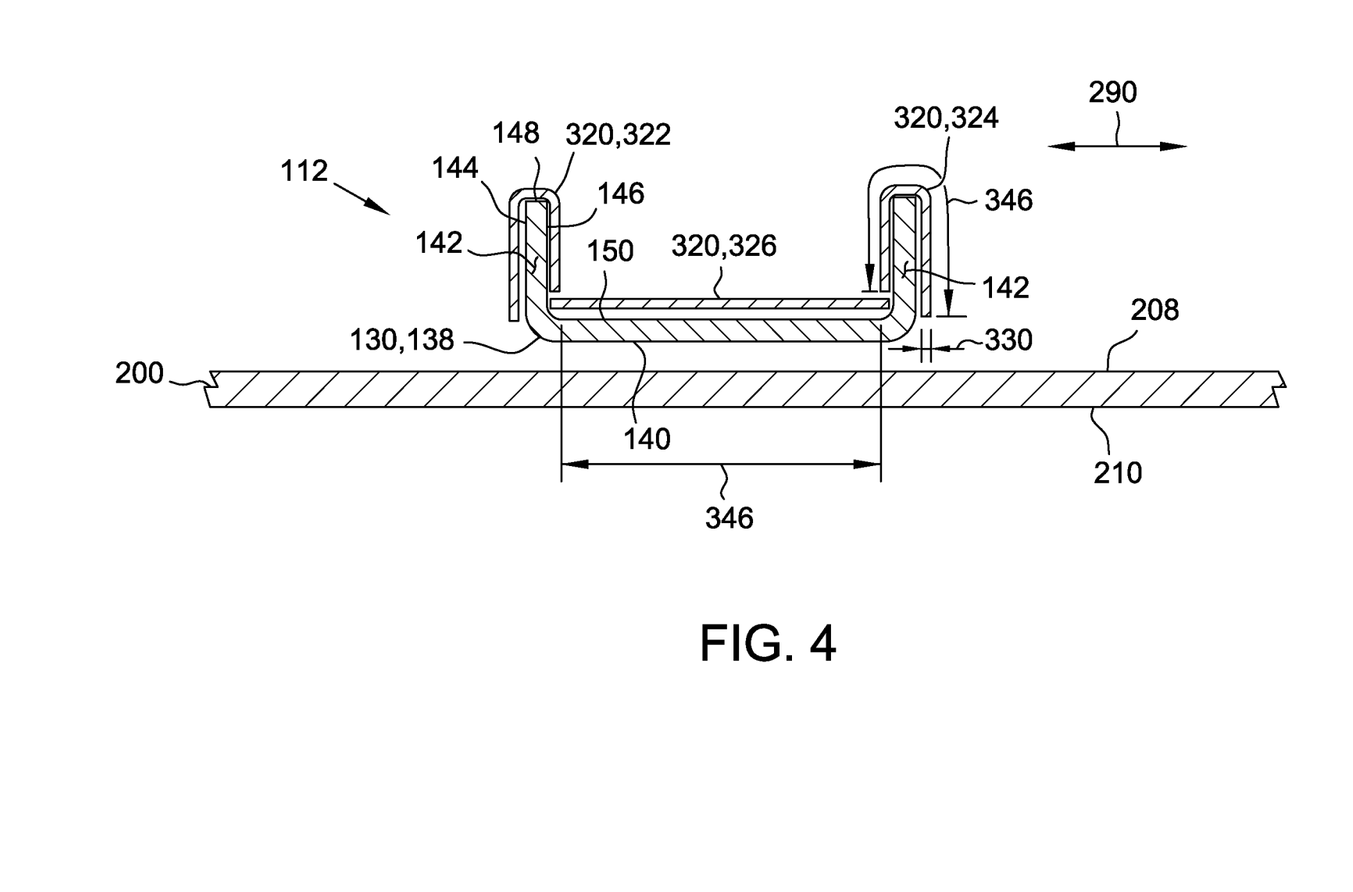
FIG. 4 is a schematic sectional view of an example of a support ring of the duct shown in FIG. 1, including a second plurality of strands adhered to a surface of the ring.

FIG. 4 is a schematic sectional view of an example of support ring 130 of duct 110 taken along lines 4-4 in FIG. 2, including a second plurality of strands 320 adhered to a surface of support ring 130. In the example, second plurality of strands 320 is adhered to a surface of free ring 138. Additionally or alternatively, at least a portion of second plurality of strands 320 is adhered to a surface of another support ring 130, such as fixed ring 136. In alternative examples, duct 110 does not include second plurality of strands 320.

In certain examples, each strand 320 extends circumferentially around a portion of support ring 130. Moreover, each strand 320 has a width 346 sized to fit a portion of a longitudinal sectional perimeter of support ring 130. For example, in the example, support ring 130 includes a base 140 that extends generally parallel to exterior surface 208 along longitudinal direction 290, and a flange 142 that extends transversely outward from base 140. Flange 142 includes a first outer surface 144, a first inner surface 146 opposite first outer surface 144, and an edge surface 148 connecting first inner surface 146 and first outer surface 144. First inner surface 146 and first outer surface 144 extend transversely outward from base 140. Second plurality of strands 320 adhered to the surface of support ring 130 includes a first strand 322 having width 346 sized to fit the longitudinal sectional perimeter of flange 142. In other words, width 346 of first strand 322 extends from first outer surface 144, across edge surface 148, to first inner surface 146 (i.e., width 346 of first strand 322 wraps around flange 142). For example, flange 142 extends outward about 0.30 inches from base 140, and first strand 322 has width 346 of about 0.75 inches wrapped around flange 142. In alternative examples, first strand 322 has any suitable width 346 that enables support ring 130 to function as described herein.

In the illustrated example, flange 142 is one of a plurality of similarly shaped flanges 142 of support ring 130, and a respective additional strand 324 of second plurality of strands 320 is adhered to each of the other flanges 142 in a similar configuration to first strand 322. In alternative examples, support ring 130 includes a single flange 142. In other alternative examples, support ring 130 does not include flange 142.

In certain examples, strands 320 have a thickness 330 in a range from about 0.004 inches to about 0.010 inches. Moreover, in some examples, strands 320 have thickness 330 in a range from about 0.005 inches to about 0.007 inches. In alternative examples, strands 320 have thickness 330 in any suitable range that enables duct 110 to function as described herein. In particular, in some examples, strands 320 are formed from a commercial off-the-shelf fiberglass adhesive tape. In alternative examples, strands 320 are formed from a commercial off-the-shelf fiberglass cloth cut to a selected width and adhered to support ring 130 using a suitable commercial off-the-shelf adhesive. In other alternative examples, strands 320 are formed from any suitable material and adhered to support ring 130 in any suitable fashion that enables duct 110 to function as described herein.

In the example, second plurality of strands 320 further includes a base strand 326 having width 346 sized to fit on an exterior surface 150 of base 140. For example, exterior surface 150 extends for about 1 inch in longitudinal direction 290, and base strand 326 has width 346 of about 1 inch. In certain examples, coverage of exterior surface 150 and surfaces 144, 146, and 148 of flange 142 separately with base strand 326 and first strand 322, respectively, enhances the inhibition of cracking as discussed above, while also reducing or eliminating pucker and/or creases in second plurality of strands 320, such as at the inside corner between exterior surface 150 and first inner surface 146 of flange 142. In alternative examples, second plurality of strands 320 does not include base strand 326.

In some examples, as described above, duct portion 112 is subjected to operational vibrational forces. In some such examples, absent second plurality of strands 320 adhered to a surface of support ring 130, support ring 130 is at risk of cracking in response to the operational vibrational loads, particularly vibrational loads in the plane defined by first lateral direction 292 and second lateral direction 294 (shown in FIG. 2). However, second plurality of strands 320 adhered to the surface of support ring 130 and dimensioned as described herein unexpectedly inhibits or prevents such cracking of support ring 130 under identical vibrational loads. A fourth test duct portion, lacking second plurality of strands 320 but otherwise in accordance with duct portion 112 as described above, failed a test for crack damage of support rings 130 under predicted dynamic loads and environments as outlined in NASA-HDBK-7005. A fifth test duct portion, otherwise identical to the fourth test duct portion but including second plurality of strands 320 adhered to the surface of support rings 130 as described above, was undamaged in an identical test. Moreover, such a result is unexpected and not predictable based on known structural properties of strands 320 having the dimensions and physical properties described herein. As noted above, such strands are typically not considered to have any structural strength or stiffness, and known methods of structural analysis have identified no anti-cracking effect or other structural benefit of the strands.

In the example, a respective portion of the second plurality of strands 320 are arranged in an end-to-end overlapping relationship about an entire circumference of flange 142 and/or of base 140. In other words, an entire circumference of flange 142 and/or of base 140 is covered by multiple stands 320 arranged end-to-end, such that the end of each strand 320 overlaps the end of a circumferentially adjacent strand 320. In some such examples, the use of overlapping multiple strands reduces an amount of local wrinkling of, and/or improves an adherence of, strands 320 along support ring 130. In alternative examples, the entire circumference of flange 142 and/or of base 140 is covered by a respective single, monolithic strand 320. In other alternative examples, less than the entire circumference of flange 142 and/or of base 140 is covered by second plurality of strands 320.

Figure 5:
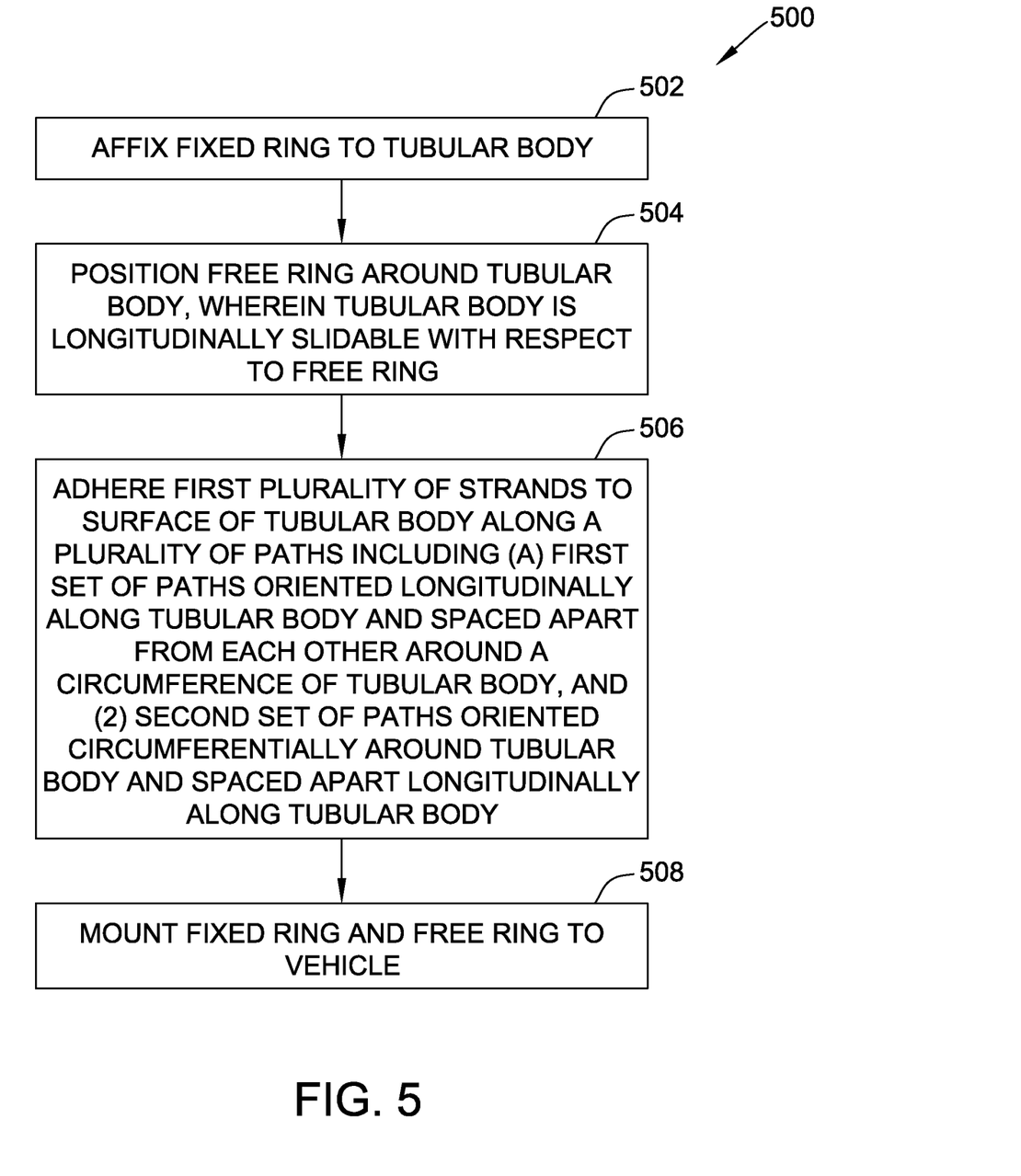
FIG. 5 is a flow diagram of an example of a method of installing the duct shown in FIG. 1 on a vehicle.

FIG. 5 is a flow diagram of an example of a method 500 of installing duct 110 on a vehicle, such as flight vehicle 102. With reference to also FIGS. 1-4, method 500 includes affixing 502 fixed ring 136 to tubular body 200. Fixed ring 136 extends circumferentially around tubular body 200. Method 500 also includes positioning 504 free ring 138 circumferentially around tubular body 200 such that tubular body 200 is longitudinally slidable with respect to free ring 138. Method 500 further includes adhering 506 first plurality of strands 220 to a surface of tubular body 200 along a plurality of paths, the plurality of paths including (1) first set of paths 222 oriented longitudinally along tubular body 200 and spaced apart from each other around a circumference of tubular body 200, and (2) second set of paths 242 oriented circumferentially around tubular body 200 and spaced apart longitudinally along tubular body 200. Additionally, method 500 includes mounting 508 fixed ring 136 and free ring 138 to the vehicle. In the example, the step of adhering 506 first plurality of strands 220 to a surface of tubular body 200 is performed after the step of mounting 508 fixed ring 136 and free ring 138 to the vehicle, i.e., after tubular body 200 is mounted in vehicle 102. Alternatively, the step of adhering 506 first plurality of strands 220 to a surface of tubular body 200 is performed at any suitable time.

In alternative examples, method 500 includes additional and/or alternative steps consistent with the disclosure herein.

Figure 6:
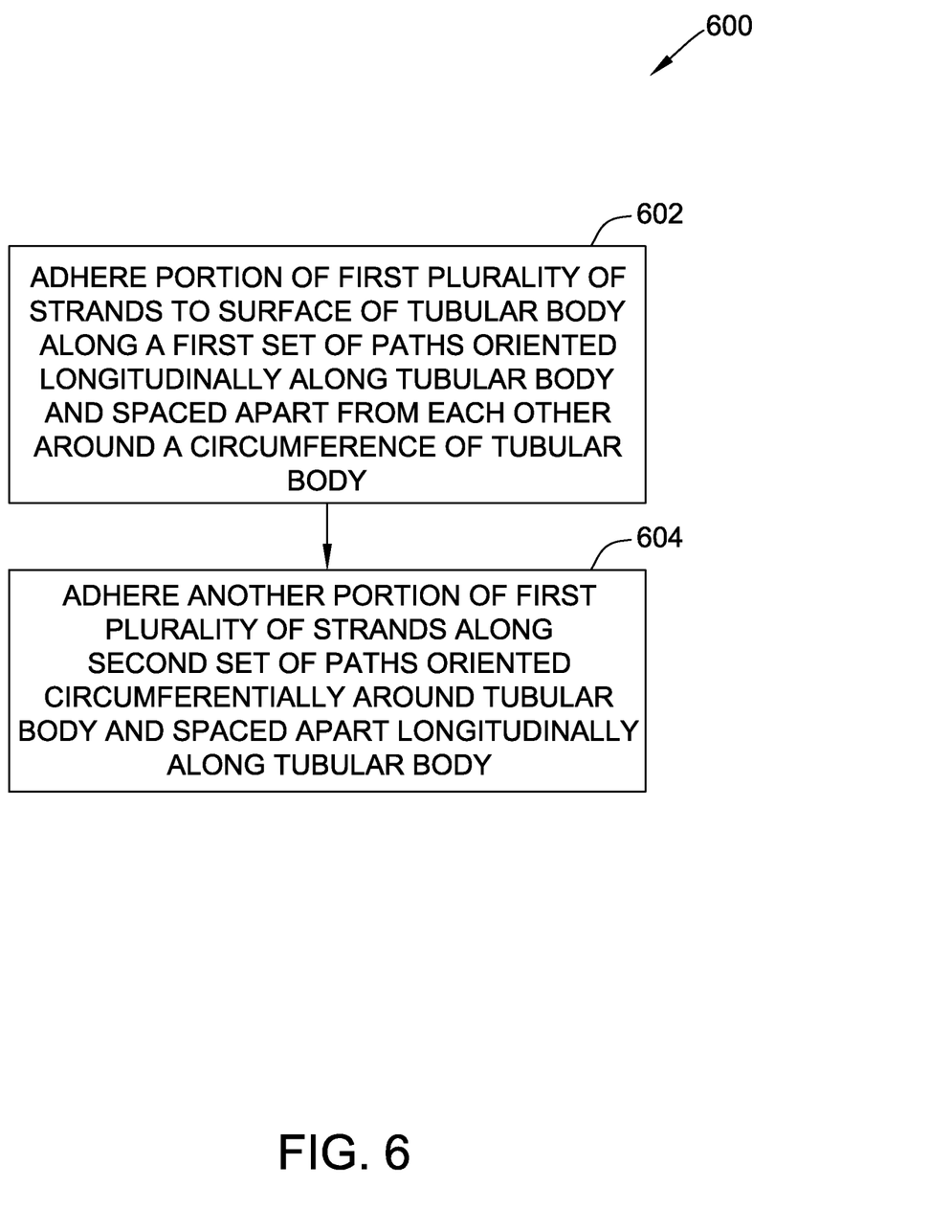
FIG. 6 is a flow diagram of an example of a method of reinforcing a duct, such as the duct shown in FIG. 1.

FIG. 6 is a flow diagram of an example of a method 600 of reinforcing a duct that includes a tubular body, such as tubular body 200. With reference to also FIGS. 1-4, in the example, method 600 includes adhering 602 a portion of first plurality of strands 220 to a surface of tubular body 200 along first set of paths 222 oriented longitudinally along tubular body 200 and spaced apart from each other around a circumference of tubular body 200. Method 600 also includes adhering 604 another portion of first plurality of strands 220 along second set of paths 242 oriented circumferentially around tubular body 200 and spaced apart longitudinally along tubular body 200. In some examples, prior to steps 602 and 604, the duct also includes fixed ring 136 affixed to tubular body 200, and free ring 138 positioned circumferentially around tubular body 200 such that tubular body 200 is longitudinally slidable with respect to free ring 138. Alternatively, the duct does not include fixed ring 136 and/or free ring 138. Moreover, in some examples, both fixed ring 136 and free ring 138 are mounted to a vehicle, such as flight vehicle 102, prior to steps 602 and 604. Alternatively, steps 602 and 604 are performed at any suitable time.

The above described examples of the systems described herein include ducts for conveying low pressure gases within a structure, such as a vehicle, and methods of installing the ducts. The examples include a tubular body formed from a polymer foam material. A first plurality of strands is adhered to a surface of the tubular body along a plurality of paths. In particular, a first set of paths extends longitudinally along the tubular body and the paths are spaced apart from each other around a circumference of the tubular body. A second set of paths extends circumferentially around the tubular body and the paths are spaced apart longitudinally. In some examples, the strands are formed from pieces of adhesive tape. In certain examples, the duct is supported by rings, and a second plurality of strands is applied to a surface of the rings. In some examples, the use of the strands, while unexpectedly reducing or eliminating an occurrence of cracking of the tubular body and/or the rings in response to operational vibration loads, thereby increasing an operational lifetime of the duct.

Example technical effects of the methods, systems, and apparatus described herein include at least one of: (a) providing a relatively low weight of the duct; (b) reducing or eliminating an occurrence of cracking of the tubular body formed from polymer foam; (c) reducing or eliminating an occurrence of cracking of the support rings; and (d) preserving a freedom of longitudinal motion of the tubular body with respect to a free support ring.

The systems and methods described herein are not limited to the specific examples described herein, but rather, components of the systems and/or steps of the methods may be utilized independently and separately from other components and/or steps described herein.

As used herein, an element or step recited in the singular and proceeded with the word "a" or "an" should be understood as not excluding plural elements or steps unless such exclusion is explicitly recited. Furthermore, references to "one example" of the present disclosure or "an example" are not intended to be interpreted as excluding the existence of additional examples that also incorporate the recited features.

This written description uses examples to disclose various examples, which include the best mode, to enable any person skilled in the art to practice those examples, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A duct configured to channel a low pressure gas within a structure, the duct comprising:
    a tubular body formed from a polymer foam material;
    a free ring extending circumferentially around the tubular body, wherein the tubular body is longitudinally slidable with respect to the free ring;
    a first plurality of strands adhered to a surface of the tubular body along a plurality of paths, the plurality of paths comprising:
        a first set of paths oriented longitudinally along the tubular body, the first set of paths spaced apart from each other around a circumference of the tubular body, wherein the first set of paths includes at least one strand overlaying the free ring; and
        a second set of paths oriented circumferentially around the tubular body, the second set of paths spaced apart longitudinally along the tubular body.

2. The duct of claim 1, further comprising:
    a fixed ring extending circumferentially around the tubular body and affixed to the tubular body.

3. The duct of claim 2, wherein at least one of the fixed ring and the free ring is formed from a thermoplastic material, the duct further comprising a second plurality of strands each adhered to at least one surface of the at least one of the fixed ring and the free ring.

4. The duct of claim 3, wherein the at least one surface of the at least one of the fixed ring and the free ring comprises a flange comprising a first outer surface, a first inner surface opposite the first outer surface, and an edge surface connecting the first inner surface and the first outer surface, and wherein the second plurality of strands comprises a first strand extending from the first outer surface, across the edge surface, to the first inner surface.

5. The duct of claim 2, wherein the second set of paths comprises:
    a first path longitudinally adjacent to a first side of one of the fixed ring and the free ring; and
    a second path longitudinally adjacent to a second side of the one of the fixed ring and the free ring, the second side longitudinally opposite the first side.

6. The duct of claim 1, wherein at least one path of the first set of paths comprises a corresponding portion of the first plurality of strands arranged in an end-to-end overlapping relationship.

7. The duct of claim 1, wherein the first set of paths is spaced apart equidistantly around the circumference of the tubular body.

8. The duct of claim 1, wherein each of the first plurality of strands is formed from a fiberglass adhesive tape.

9. The duct of claim 1, wherein the first set of paths comprises a first portion of the first plurality of strands and the second set of paths comprises a second portion of the first plurality of strands, and wherein the second portion overlays the first portion.

10. The duct of claim 1, wherein the first set of paths includes at least one strand beneath the free ring.

11. A duct configured to channel a low pressure gas within a vehicle, the duct comprising:
    a tubular body formed from a polymer foam material;
    a fixed ring mounted to the vehicle and extending circumferentially around the tubular body, wherein the fixed ring is affixed to the tubular body;
    a free ring mounted to the vehicle and extending circumferentially around the tubular body, wherein the tubular body is longitudinally slidable with respect to the free ring; and
    a first plurality of strands adhered to a surface of the tubular body along a plurality of paths, the plurality of paths comprising:
        a first set of paths oriented longitudinally along the tubular body, the first set of paths spaced apart from each other around a circumference of the tubular body, wherein the first set of paths includes at least one strand overlaying the free ring; and
        a second set of paths oriented circumferentially around the tubular body, the second set of paths spaced apart longitudinally along the tubular body.

12. The duct of claim 11, wherein at least one of the fixed ring and the free ring is formed from a thermoplastic material, the duct further comprising a second plurality of strands each adhered to at least one surface of the at least one of the fixed ring and the free ring.

13. The duct of claim 11, wherein at least one path of the first set of paths comprises a corresponding portion of the first plurality of strands arranged in an end-to-end overlapping relationship.

14. The duct of claim 11, wherein the first set of paths is spaced apart equidistantly around the circumference of the tubular body.

15. The duct of claim 11, wherein each of the first plurality of strands is formed from a fiberglass adhesive tape.

16. The duct of claim 11, wherein the first set of paths includes at least one strand beneath the free ring.

17. A method of installing a duct on a vehicle, the duct configured to channel a low pressure gas, the method comprising:
    affixing a fixed ring to a tubular body, wherein the fixed ring extends circumferentially around the tubular body;
    positioning a free ring circumferentially around the tubular body, wherein the tubular body is longitudinally slidable with respect to the free ring;
    adhering a first plurality of strands to a surface of the tubular body along a plurality of paths, the plurality of paths including:
        a first set of paths oriented longitudinally along the tubular body, the first set of paths spaced apart from each other around a circumference of the tubular body, wherein the first set of paths includes at least one strand overlaying the free ring; and
        a second set of paths oriented circumferentially around the tubular body, the second set of paths spaced apart longitudinally along the tubular body; and
    mounting the fixed ring and the free ring to the vehicle.

18. The method of claim 17, wherein at least one of the fixed ring and the free ring is formed from a thermoplastic material, the method further comprising adhering each of a second plurality of strands to at least one surface of the at least one of the fixed ring and the free ring.

19. The method of claim 17, wherein adhering the first plurality of strands to the surface of the tubular body comprises, for at least one path of the first set of paths, arranging a corresponding portion of the first plurality of strands in an end-to-end overlapping relationship.

20. The method of claim 17, wherein adhering the first plurality of strands to the surface of the tubular body comprises:
    adhering a first portion of the first plurality of strands to form the first set of paths; and
    after adhering the first portion, adhering a second portion of the first plurality of strands to form the second set of paths, such that the second portion overlays the first portion.

* * * * *